United States Patent
Yoon et al.

(10) Patent No.: US 11,182,404 B2
(45) Date of Patent: Nov. 23, 2021

(54) DATA REPLICATION TECHNIQUE IN DATABASE MANAGEMENT SYSTEM

(71) Applicant: Silcroad Soft, Inc., Gyeonggi-do (KR)

(72) Inventors: Jeong Il Yoon, Gyeonggi-do (KR); Owook Jo, Gyeonggi-do (KR)

(73) Assignee: Silcroad Soft, Inc.

( * ) Notice: Subject to any disclaimer, the term of this patent is extended or adjusted under 35 U.S.C. 154(b) by 194 days.

(21) Appl. No.: 16/461,726

(22) PCT Filed: Nov. 9, 2017

(86) PCT No.: PCT/KR2017/012686
§ 371 (c)(1),
(2) Date: May 16, 2019

(87) PCT Pub. No.: WO2018/093094
PCT Pub. Date: May 24, 2018

(65) Prior Publication Data
US 2019/0361913 A1    Nov. 28, 2019

(30) Foreign Application Priority Data

Nov. 16, 2016  (KR) .................. 10-2016-0152454

(51) Int. Cl.
| | | |
|---|---|---|
| G06F 16/27 | (2019.01) |
| G06F 16/182 | (2019.01) |
| G06F 16/14 | (2019.01) |
| G06F 16/18 | (2019.01) |
| G06F 16/21 | (2019.01) |
| G06F 16/23 | (2019.01) |

(52) U.S. Cl.
CPC .......... *G06F 16/273* (2019.01); *G06F 16/156* (2019.01); *G06F 16/1844* (2019.01); *G06F 16/1858* (2019.01); *G06F 16/213* (2019.01); *G06F 16/2358* (2019.01); *G06F 16/2365* (2019.01)

(58) Field of Classification Search
None
See application file for complete search history.

(56) References Cited

U.S. PATENT DOCUMENTS

| | | | |
|---|---|---|---|
| 5,758,149 A * | 5/1998 | Bierma | G06F 16/2308 |
| 6,732,124 B1 * | 5/2004 | Koseki | G06F 11/1435 |
| 6,889,231 B1 * | 5/2005 | Souder | G06F 16/27 |
| 6,999,977 B1 | 2/2006 | Norcott et al. | |
| 7,076,508 B2 | 7/2006 | Bourbonnais et al. | |
| 7,111,023 B2 | 9/2006 | Norcott | |

(Continued)

FOREIGN PATENT DOCUMENTS

KR  10-2004-0088397 A    10/2004

*Primary Examiner* — Uyen T Le
(74) *Attorney, Agent, or Firm* — Fish IP Law, LLP

(57) ABSTRACT

The present invention contemplated the use of Change Data Capture (CDC) between a source database and a target database. To execute CDC, one or more computer processors execute the steps of obtaining a plurality of log records comprising information on transactions processed in the source database, grouping the plurality of log records into a plurality of groups based on a predetermined condition, and determining that the plurality of obtained log records is to be replicated from the source database to the target database in parallel in a unit of a group.

16 Claims, 6 Drawing Sheets

(56) References Cited

U.S. PATENT DOCUMENTS

| | | | |
|---|---|---|---|
| 7,548,898 B1* | 6/2009 | Tarenskeen | G06F 16/214 |
| 7,647,354 B2 | 1/2010 | Norcott | |
| 7,668,884 B2 | 2/2010 | Prahlad et al. | |
| 8,606,744 B1* | 12/2013 | Dageville | G06F 16/2386 |
| | | | 707/602 |
| 8,938,420 B1* | 1/2015 | Thakur | G06F 16/1827 |
| | | | 707/615 |
| 10,169,169 B1* | 1/2019 | Shaikh | G06F 11/1474 |
| 2003/0055808 A1* | 3/2003 | Bhat | G06F 16/2358 |
| 2004/0199552 A1 | 10/2004 | Ward et al. | |
| 2005/0273474 A1* | 12/2005 | Kawamura | G06F 11/2097 |
| 2011/0302136 A1 | 12/2011 | Lakshminath et al. | |
| 2014/0025646 A1* | 1/2014 | Canales Valenzuela | |
| | | | G06F 16/2365 |
| | | | 707/691 |
| 2014/0310231 A1* | 10/2014 | Sampathkumaran | |
| | | | G06F 16/254 |
| | | | 707/602 |
| 2017/0116241 A1* | 4/2017 | Kumar | G06F 16/278 |
| 2018/0005418 A1* | 1/2018 | Kim | G06T 11/206 |

* cited by examiner

DATA REPLICATION TECHNIQUE IN DATABASE MANAGEMENT SYSTEM

CROSS-REFERENCE TO RELATED APPLICATIONS

This application claims priority to and the benefit of Korean Patent Application No. 10-2016-0152454 filed in the Korean Intellectual Property Office on Nov. 16, 2016, the entire contents of which are incorporated herein by reference.

TECHNICAL FIELD

The present invention relates to database management, and more particularly, to an improvement to Change Data Capture techniques.

BACKGROUND ART

Enterprise business is rapidly expanding due to an explosive increase in data and an appearance of various environments and platforms. According to the advent of a new business environment, there is a need for more efficient and flexible data service and information processing and data management functions. According to the change, research on a database for solving high performance, high availability, and expandability issues, which are the bases of the implementation of the enterprise business, is continuously conducted.

Data managed in enterprise business needs to be migrated or replicated from a source location to a target location and be managed. For example, a database system for implementing the banking business may be divided into a database accessible by a plurality of external customers at the same time and a database accessible by internal employees according to a characteristic of an accessing client. In order to maintain consistency of data in the use of two databases in one database system, both databases need to be synchronized. However, in order to implement the synchronization, overhead for resources of the databases may be caused.

Recently, according to the growing demand by company's need for real-time data analysis, there is a need for a technology that when data is changed in a specific DB, captures the data and transfers the captured data to another DB. A dataware (DW) house that is a company analysis DB generally updates the data generated during business hours until the day before at night time at which work is ended through a batch. Because of this, in the existing DW structure, data until yesterday is inevitably an analysis target. For example, when a bank checks the customer's loan, the data until yesterday was viewed and evaluated. Accordingly, customer's information changed today may be missed by the loan check.

As a means for implementing synchronization between the databases in real time, a Change Data Capture (CDC) technology is in the spotlight. The CDC technology is a data replication solution by capturing changed data in a data source and transferring the captured data to a target system. The CDC may be used for monitoring and tracking transactions in database systems, and particularly, may be used for monitoring and tracking changes in committed data in a database system. The CDC technology allows data change contents of a source database to be captured, the captured data change contents to be transferred to a target system, and the data to be replicated from the source database to the target database.

For example, U.S. Pat. No. 6,999,977 to Norcott discloses a method of change data capture, in which modifications made to online transaction processing tables are maintained in a database object. Additionally, U.S. Pat. No. 7,111,023 to Norcott discloses a synchronous change data capture system that uses a transaction identifier that uniquely identifies each transaction is recorded along with the change data.

The CDC technology may extract data of an entire table with the small number of sessions. Further, in the CDC technology, a data file is not directly accessed, so that there is an advantage in that it is possible to decrease a use rate of a resource within a Database Management System (DBMS).

The CDC technology is used in various fields in addition to the foregoing fields. The CDC technology is utilized for preventing a service from being interrupted when a system is migrated. A service should never be shut down even for a short time, consequently, it is not easy to upgrade a mission-critical system seamlessly. However, when the CDC is used in this situation, old equipment may be shut down in the state where the databases are synchronized, so that it is possible to prevent downtime. Further, in the case where the system is duplexed for securing high availability, the CDC technology may be usefully used.

However, in the CDC technology, a delay may occur in synchronizing data with a runtime when the large amount of data is generated. In addition, the CDC technology has a disadvantage in that when a table structure is changed and the like, there may incur a problem related to consistency of data synchronization.

Accordingly, there is a need for a CDC technology which is capable of decreasing a delay for data synchronization between a source database and a target database and does not cause a problem for data synchronization even when a table structure is changed.

SUMMARY OF THE INVENTION

The present disclosure presents technical characteristics for decreasing a delay for data synchronization between a source database and a target database.

Further, the present disclosure presents a Change Data Capture (CDC) technology which does not cause a problem for data synchronization even when a table structure is changed.

An exemplary embodiment of the present disclosure provides a computer program which includes encoded commands and is stored in a computer readable medium. When the computer program is executed by one or more processors of a computer system, the computer program may cause the one or more processors to perform operations below for Change Data Capture (CDC) between a source database and a target database. Herein, the operations may include: obtaining a plurality of log records including information on transactions processed in the source database; grouping the plurality of log records to a plurality of groups based on a predetermined condition, in which the log records belonging to each of the plurality of groups are arranged in a group based on an order of a point in time of an occurrence of the log records; and determining that the plurality of obtained log records is to be replicated from the source database to the target database in parallel in a unit of a group.

Another exemplary embodiment of the present disclosure provides a server for performing CDC between a source database and a target database. The server may include: a log record obtaining and analyzing module which obtains a plurality of log records including information on transactions processed in the source database; a grouping module which groups the plurality of log records to a plurality of groups based on a predetermined condition, in which the log records belonging to each of the plurality of groups are arranged in a group based on an order of a point in time of an occurrence of the log records; and a control module which determines that the plurality of obtained log records is to be replicated from the source database to the target database in parallel in a unit of a group.

Still another exemplary embodiment of the present disclosure provides a method for performing CDC between a source database and a target database. The method may include: obtaining a plurality of log records including information on transactions processed in the source database; grouping the plurality of log records into a plurality of groups based on a predetermined condition, in which the log records belonging to each of the plurality of groups are arranged in a group based on an order of a point in time of an occurrence of the log records; and determining that the plurality of obtained log records is to be replicated from the source database to the target database in parallel in a unit of a group.

According to the exemplary embodiments of the present disclosure, there are disclosed technical characteristics for decreasing a delay for data synchronization between the source database and a target database.

The present disclosure may provide a CDC technology which does not cause a problem for data synchronization even when a table structure is changed.

BRIEF DESCRIPTION OF THE DRAWINGS

Various aspects are described with reference to the drawings, and herein, like reference numerals are generally used to designate like constituent elements. In the exemplary embodiment below, for the purpose of description, a plurality of specific and detailed matters is suggested in order to provide general understanding of one or more aspects. However, it will be apparent that the aspect(s) may be carried out without the specific details. In other examples, publicly known structures and devices are illustrated in the form of a block diagram for easy description of one or more aspects.

DETAILED DESCRIPTION

Figure 1:
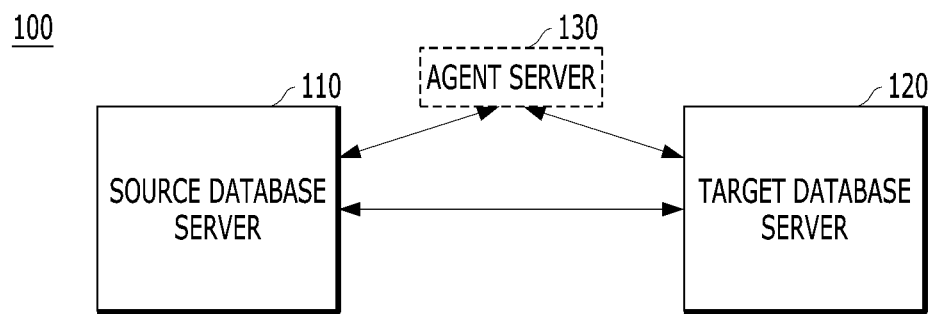
FIG. 1 is a diagram illustrating an example of a database system according to an exemplary embodiment of the present disclosure.

Various exemplary embodiments and/or aspects are now disclosed with reference to the drawings. In the description below, the plurality of particular detailed matters are disclosed for helping general understanding of one or more aspects for the purpose of description. However, the point that the aspect(s) is executable even without the particular detailed matters may also be recognized by those skilled in the art. The subsequent description and the accompanying drawings describe specific illustrative aspects of one or more aspects in detail. However, the aspects are illustrative, and some of the various methods of various aspects of the principles may be used, and the descriptions intend to include the aspects and the equivalents thereof.

Various aspects and characteristics may be presented by a system which may include a plurality of devices, components, and/or modules. The point that various systems may include additional devices, components, and/or modules, and/or the point that the various systems may not include all of the devices, the components, the modules, and the like discussed in relation to the drawings shall also be understood and recognized.

An "exemplary embodiment", an "example", an "aspect", an "illustration", and the like used in the present specification may not be construed to be better or have an advantage compared to a predetermined described aspect, an aspect having a different design, or designs. Terms, such as "component", "module", "system", and "interface" used below generally mean computer-related entities, and may mean, for example, hardware, a combination of hardware and software, and software.

A term "or" intends to mean comprehensive "or" not exclusive "or". That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

A term "include" and/or "including" means that a corresponding characteristic and/or a constituent element exists, but it shall be understood that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

In the present specification, a computer readable medium may include all kinds of storage medium in which a program and data is stored so as to be readable by a computer system. According to one aspect of the present invention, the medium may include a Read Only Memory (ROM), a Random Access Memory (RAM), a Compact Disk (CD)-ROM, a Digital Video Disk (DVD)-ROM, a magnetic tape, a floppy disk, an optical data storage device, and the like. In addition, the medium may be distributed in systems connected through a network and also store computer-readable codes and/or commands by a distribution scheme.

Before describing particular contents for carrying out the present invention, a configuration that is not directly related to a technical main point of the present invention is omitted within the range of the technical main point of the present invention. Further, the terms or the words used in the present specification and the claims shall be interpreted as a meaning and a concept corresponding to the technical spirit of the present invention on the principle that the inventor can appropriately define a concept of a term for describing the invention by the best method.

In the present specification, a database and a database server may be interchangeably used. Further, in the present specification, a log record and a transaction log may be mutually interchangeably used.

FIG. 1 is a schematic diagram illustrating a database system 100 according to an exemplary embodiment of the present invention.

As illustrated in FIG. 1, the database system 100 may include a source database server 110, a target database server 120, and/or an agent server 130.

Although not illustrated in FIG. 1, the database system 100 may include a client, and the client may mean a node(s) in a system having a mechanism for communicating with database servers. For example, the client may include a Personal Computer (PC), a laptop computer, a workstation, a terminal, and/or a predetermined electronic device having network accessibility. Further, the client may also include a predetermined server implemented by at least one of an agent, an Application Programming Interface (API), and plug-in.

In the exemplary embodiment of the present invention, operations of the source database server 110, the target database server 120, and/or the agent server 130 which are to be described below may be performed according to a query issued from a client.

The database servers 110 and 120 may include, for example, a predetermined type of computer system, such as a microprocessor, a main-frame computer, a digital single processor, a portable device, a device controller, or a computer device. Although not illustrated, each of the database servers 110 and 120 may include a Database Management System (DBMS) and/or a persistent storage medium.

In the present specification, the source database server 110 and the target database server 120 may mean nodes in the database system 100. In an additional exemplary embodiment, the source database server 110 and the target database server 120 may be combined in one database server and managed and/or clustered. The source database server 110 and the target database server 120 may be combined in one database server to configure an associated multi-database.

In the exemplary embodiment of the present invention, the source database server 110 and the target database server 120 may also mean remotely located heterogeneous database servers. Further, FIG. 1 illustrates two database servers, but database servers more than two may also be included in the scope of the present invention.

Although not illustrated in FIG. 1, the database servers 110 and 120 may include one or more memories including a buffer cache. Further, although not illustrated in FIG. 1, the database servers 110 and 120 may include one or more processors. Accordingly, the DBMS within the database server may be operated by the processor in the memory.

Herein, the memory is a main storage device, such as a random access memory (RAM) including a dynamic RAM (DRAM) and a static RAM (SRAM), to which a processor directly accesses, and may mean a volatile storage device, in which when power is cut, stored information is momentarily erased, but the memory is not limited thereto. The memory may be operated by the processor. The memory may temporarily store log records according to a data table including data values and a transaction. For example, the log records may also be stored in a separate transaction log storage unit of the memory. In the present specification, the transaction may generally mean a continuous processing unit for a series of operations, such as information exchange or database update. The transaction represents a basic unit of an operation for completing an operation requested in the state where integrity of the database is secured.

In the exemplary embodiment of the present invention, the data values and/or the log records of the data table may be recorded from the memory in a persistent storage medium. In an additional aspect, the memory may include a buffer cache, and the data and/or the log records may be stored in a block of the buffer cache. The data and/or the log records may be recorded in a persistent storage medium by a background process.

The persistent storage medium within the database server means a non-volatile storage medium, such as a storage device based on a flash memory and/or a battery-backup memory, which is capable of continuously storing predetermined data, as well as a magnetic disk, an optical disk, and a magneto-optical storage device. The persistent storage medium may communicate with processors and memories of the database servers 110 and 120 through various communication means. In an additional exemplary embodiment, the persistent storage medium may be located outside the database servers 110 and 120 and communicate with the database servers 110 and 120.

The DBMS is a program for allowing performance of operations, such as search, insertion, correction, and deletion of required data, and/or a management of a log record, in the database servers 110 and 120, and as described above, the DBMS may be implemented by the processors in the memories of the database servers 110 and 120.

The client and the database servers 110 and 120, or the database servers 110 and 120 may communicate with each other through a network (not illustrated). The network according to the exemplary embodiment of the present invention may use various wired communication systems, such as a public switched telephone network (PSTN), an x digital subscriber line (xDSL), a rate adaptive DSL (RADSL), a multi rate DSL (MDSL), a very high speed DSL (VDSL), a universal asymmetric DSL (UADSL), a high bit rate DSL (HDSL), and a local area network (LAN).

The network presented in the present specification may use various wireless communication systems, such as code division multi access (CDMA), time division multi access (TDMA), frequency division multi access (FDMA), orthogonal frequency division multi access (OFDMA), single carrier-FDMA (SC-FDMA), and other systems. As an additional exemplary embodiment, the network in the present specification may also include a database link (dblink), and thus, the database servers 110 and 120 may communicate with each other through the database link and fetch data/log records from the database servers 110 and 120 or another database server. The technologies described in the present specification may also be used in other networks, as well as the foregoing networks.

As illustrated in FIG. 1, the source database server 110 may be located at a remote place of the target database server 120. The source database server 110 and the target database server 120 may mean the same type of servers or non-compatible heterogeneous database servers.

Additionally, the source database server 110 which is a predetermined type of database may include a device including a processor and a memory for executing and storing commands, but is not limited thereto. That is, the source database may also include software, firmware, hardware, or a combination thereof. The software may include an application(s) for generating, deleting, and correcting a database table, a schema, an index, and/or data. The source database server 110 may receive transactions from a client or another computing device, and examples of the transaction may include search, addition, correction, and/or deletion of data, a table, and/or an index in the source database server 110.

The target database server 120 may mean a database server in which data change contents generated in the source database server 110 is replicated or synchronized, and may include at least some of the characteristics of the source database server 110. For example, the target database server 120 may store copies of the data, the data types, the tables, the index, and/or the log records of the source database server 110.

In the present specification, the log record may mean data record for identifying change contents for a structure and an organization of data, and/or change contents related to a table, a column, a data type, an index, and data within the database.

In the exemplary embodiment of the present invention, the agent server 130 may mean a separate entity for implementing a Change Data Capture (CDC) between the source database server 110 and the target database server 120. Accordingly, the agent server 130 may perform predetermined operations for implementing the characteristics of the CDC.

The agent server 130 which is a predetermined type of server may include a device including a processor and a memory for executing and storing command, but is not limited thereto. The agent server 130 may also include software, firmware, hardware, or a combination thereof. For example, the software implementing the operations of the agent server 130 may be installed in the source database server 110 and/or the target database server 120.

Functions of the agent server 130 illustrated in FIG. 1 may be integrated as a part in the source database server 110 and/or the target database server 120. For example, a CDC function of the agent server 130 may be replaced with the target database server 120.

Figure 2:
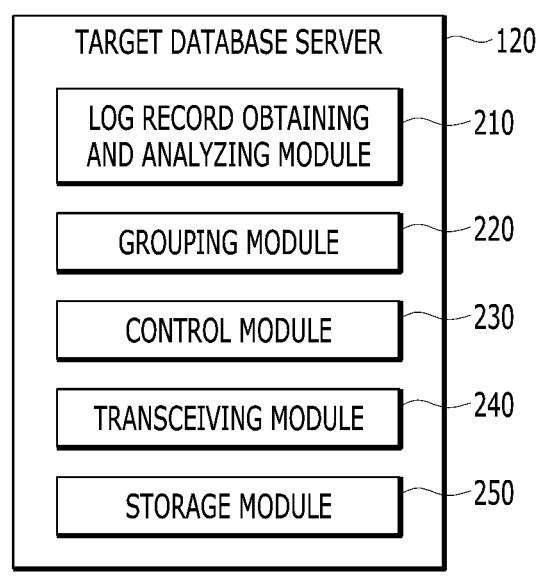
FIG. 2 is a diagram illustrating an example of an agent server according to the exemplary embodiment of the present disclosure.

FIG. 2 illustrates an example of the agent server 130 according to the exemplary embodiment of the present disclosure. In FIG. 2, the agent server 130 is illustrated as an example, but as described above, the agent server 130 may be replaced with the source database server 110 and/or the target database server 120, or a combination thereof.

As illustrated in FIG. 2, the agent server 130 may include a log record obtaining and analyzing module 210, a grouping module 220, a control module 230, a transceiving module 240, and a storing module 250. The components of the agent server 130 are illustrative examples, and additional components may exist or some of the components may also be omitted.

The log record obtaining and analyzing module 210 may obtain a plurality of log records including information on transactions processed in the source database. When data, a table, an index, and the like are changed in the source database according to a transaction disclosed by a client, a log record for the corresponding transaction may be recorded in the source database. In this case, the agent server 130 may obtain a log record(s) for the changed data and analyze the obtained log data(s) by analyzing a transaction log and the like recorded in a log buffer and/or a log file of the source database server 110. The log record obtaining and analyzing module 210 may also obtain only the changed data by analyzing the transaction log. In addition, the agent server 130 may also simply receive a log record determined by the source database server 110 from the source database server 110.

In the exemplary embodiment of the present invention, the source database server 110 may include, for example, a change table including changed data for a corresponding table. The agent server 130 may obtain a log record by analyzing the change table. In another exemplary embodiment, the agent server 130 may obtain a log record by extracting a series of transactions from a log by using a transaction log. Each of the plurality of log records may include information for uniquely identifying a transaction, and information for identifying a data record changed according to the transaction.

The grouping module 220 may generate a plurality of groups by grouping the plurality of log records obtained by the log record obtaining and analyzing module 210 based on a predetermined condition. For example, the grouping module 220 may perform the grouping based on database object identification information related to each of the transactions. For example, when a database object is a table, the grouping may be performed in the unit of a table, and the transactions performed for the same table may belong to one group.

In one aspect of the present invention, the predetermined condition may be determined according to an object reference. Further, the predetermined condition may include a condition for whether dependency exists between the objects, and the dependency may be determined based on reference between a primary key and a foreign key. Herein, the primary key may include a key for uniquely identifying data stored in an object (for example, a table), and the foreign key may include a primary key column referred by another object in a specific object in order to generate a connection between the respective tables. For example, a primary key in a specific table is connected with a foreign key of another table, so that connectivity may be established between the tables. In one aspect of the present invention, when the dependency (a reference relationship between the primary key and the foreign key) exists between the objects, the grouping module 220 may group the corresponding objects into one group.

The grouping module 220 may arrange the log records in the group based on an order according to an order (for example, a system Change Number (SCN)) of a point in time of the occurrence of the log records within the group when generating the group.

The control module 230 may control the general operations of the agent server 130. That is, the control module 230 may perform a capture operation for the log record according to the transaction performed in the source database, an assembling operation for appropriately reflecting the captured log record to the target database (for example, a conversion to a format appropriate to the target database, and generation of a query (a Data Manipulation Language (DML) and/or a Data Definition Language (DDL)) recognizable by the target database), a reflecting operation for completely replicating the assembled log record in a specific region of the target database, and the like.

The control module 230 may determine that the plurality of obtained log records is to be replicated from the source database to the target database in the unit of the group grouped by the grouping module 220 in parallel. Each group may correspond to each thread, and the replication processes may be progressed in parallel by the respective threads. Further, in an additional exemplary embodiments, one thread may also process the plurality of groups.

In the exemplary embodiment of the present invention, the agent server 130 may independently perform the replication of one or more log records associated with a commit command from the source database to the target database in the unit of the group in response to the reception of the commit command.

In the exemplary embodiment of the present invention, each of the plurality of log records may include information for uniquely identifying the transaction and/or information for identifying a data record changed according to the transaction.

Accordingly, the transaction logs of the source database recorded in time series are principally reflected to the target database by each thread in the unit of the group in parallel, so that efficiency of the synchronization between the databases may be achieved.

According to the technical characteristics according to the exemplary embodiment of the present invention, the log records extracted in time series are grouped and reflected to the target database in parallel, so that it is possible to remarkably reduce overhead by the replication of the database or the synchronization of the database.

In response to the reception, by the transceiving module 240, of a query defining a relationship between the transactions, the control module 230 may determine to perform group reconfiguration for one or more groups associated with the transactions included in the query. For example, the query may include a DDL defining a relationship between the transactions and/or a structure of the transaction. In this case, the control module 230 may determine whether the relationship defined in the DDL is included in a predetermined relationship (or a condition) (for example, in the case where a dependency relationship between the objects is changed).

In one aspect of the present invention, when the dependency between the objects (reference between the primary key and the foreign key) is changed or generated, the control module 230 may determine to dynamically perform the group reconfiguration. For example, when a primary key (for example, a first object) and a foreign key (for example, a second object) exist, a primary key—foreign key limit condition indicating that during an insertion operation in the DML, the insertion operation needs to be performed on the first object and then needs to be performed on the second object, and during a deletion operation in the DML, the deletion operation needs to be performed on the second object and then needs to be performed on the first object is generated. In this case, in order to secure the foregoing order (that is, in order to satisfy the primary key—foreign key limit condition), the control module 230 may determine to dynamically reconfigure the group (that is, group the first object and the second object into one group). That is, the control module 230 determines whether consistency for the grouped groups is maintained by analyzing the query received from the client, and when it is determined that the consistency is not maintained, the control module 230 may determine to perform the group reconfiguration on one or more groups associated with the transactions included in the received query. The determination of whether the consistency is maintained may be determined based on whether the dependency relationship between the objects is maintained.

When it is determined that the relationship defined in the DDL is included in the predetermined relationship, the control module 230 may determine whether the transactions belonging to the predetermined relationship are included in one group. That is, the transactions belonging to the parent/child relationship have a dependent relationship in a transaction processing order, so that when the transactions belong to one group, a problem in consistency may not be generated when performing the replication reflected based on a time sequence (for example, a System Change Number (SCN)) within the group in the unit of the group. However, when the transactions belonging to the parent/child relationship do not belong to one group, the control module 230 determines to perform the group reconfiguration so that the transactions belonging to the parent/child relationship are included in one group, thereby securing consistency in the synchronization of the database.

In the present specification, the group reconfiguration may include the movement of the transaction(s) belonging to a specific group to another group.

In the exemplary embodiment of the present invention, when the query defining the relationship between the transactions and/or the relationship between the objects is received, the control module 230 may determine to stop the replication of the plurality of obtained log records from the source database to the target database until the group reconfiguration is completed. In this case, when the query defining the relationship between the transactions and/or the relationship between the objects is received, the control module 230 may determine to stop the replication of the log records associated with the transactions committed after information on the point in time of the occurrence of the query among the plurality of obtained log records from the source database to the target database while permitting the replication of the log records associated with the transactions committed before information on the point in time of the occurrence of the query among the plurality of obtained log records based on the SCN from the source database to the target database until the group reconfiguration is completed. The reason is that, for example, there is no problem in consistency even though the replication is performed on the transactions committed before the issuance of the DDL.

Then, when the group reconfiguration is completed, the control module 230 may determine to resume the replication of the plurality of obtained log records from the source database to the target database based on the reconfigured groups. In this case, the replication may be performed in the unit of the reconfigured group.

In the exemplary embodiment of the present invention, the replication of the log records to the target database may be performed based on meta information (for example, SCN information, table information, and data identification information) related to the transaction included in the log record. The target database server 120 or the agent server 130 may analyze the obtained log records, and assemble the corresponding log records in the form (for example, a data form recognizable by the processors of the target database) that may be reflected to the target database server 120. For example, when a first transaction performed in the source database is related to a first table, the first transaction may be reflected to the first table of the target database.

In an additional exemplary embodiment of the present invention, the control module 130 may monitor a hit rate for one or more configured (or reconfigured) groups. The control module 130 may determine to perform the group reconfiguration on one or more groups associated with the transactions included in the query based on the monitored hit rate and the received query. Herein, the hit rate may include predetermined information indicating quantitative information of log records processed/generated in each group including information on the number of times of the occurrence of the log records in each group. In this case, the control module 130 may move the log records belonging to a group having a larger number of times of the occurrence of log records to a group having a smaller number of times of the occurrence of log records.

For example, when the transactions related to the first table corresponding to a first group are excessively frequently generated, the number of log records belonging to the first group is larger than the number of log records belonging to another group, so that the replication for the first group is relatively inevitably delayed. In the exemplary embodiment of the present invention, in this case, the group reconfiguration may be performed. For example, the control module 230 or the grouping module 220 may divide the first group into a first sub group and a second sub group thereby improving efficiency in a database replication speed. As another example, the control module 230 or the grouping module 220 may move the log records of the first group to a second group, thereby improving efficiency of the database replication.

The transceiving module 240 may provide a function of communicating with the database servers and/or a client. For example, the transceiving module 240 may receive the extracted log records from the source database server. Further, the transceiving module 240 may communicate with the database servers and/or a client by using the predetermined network and/or database link.

When FIG. 2 is interpreted as the source/target database server 110 and 120, not the agent server 130, the transceiving module 240 may receive a request for data storage, data change, data inquiry, index build, index change, index inquiry, and the like from a client. As an alternative example, the transceiving module 240 may also transfer information from the source database server 110 to the target database server 120 by a method of invoking a procedure from the target database server 120. Further, the transceiving module 240 may provide a function of transceiving predetermined data/information transferred between the servers in relation to the database replication.

The storage module 250 may store the predetermined data stored in relation to the performance of the CDC, such as the storage of the extracted log record.

When FIG. 2 is interpreted as the source/target database server 110 and 120, not the agent server 130, the storage module 250 may store the predetermined data stored in relation to the performance of the tasks of the database servers 110 and 120. The storage module 245 may be included in a DBMS and/or a persistent storage medium. In addition, the storage module 250 of the target database server 120 may store the log records generated in the source database server according to the grouping (or the reconfigured grouping) in the target database server 120. Further, the storage module 250 may process and manage a request related to the storage (including the update) of the data in the server. The storage module 250 may determine to store data, an index table, and the like. Further, the storage module 250 may determine a storage position for the data and/or the index table. For example, the storage module 250 may determine a storage position of the data in the data table. As another example, the storage module 250 may determine a storage position of the data in the persistent storage medium.

Figure 3:
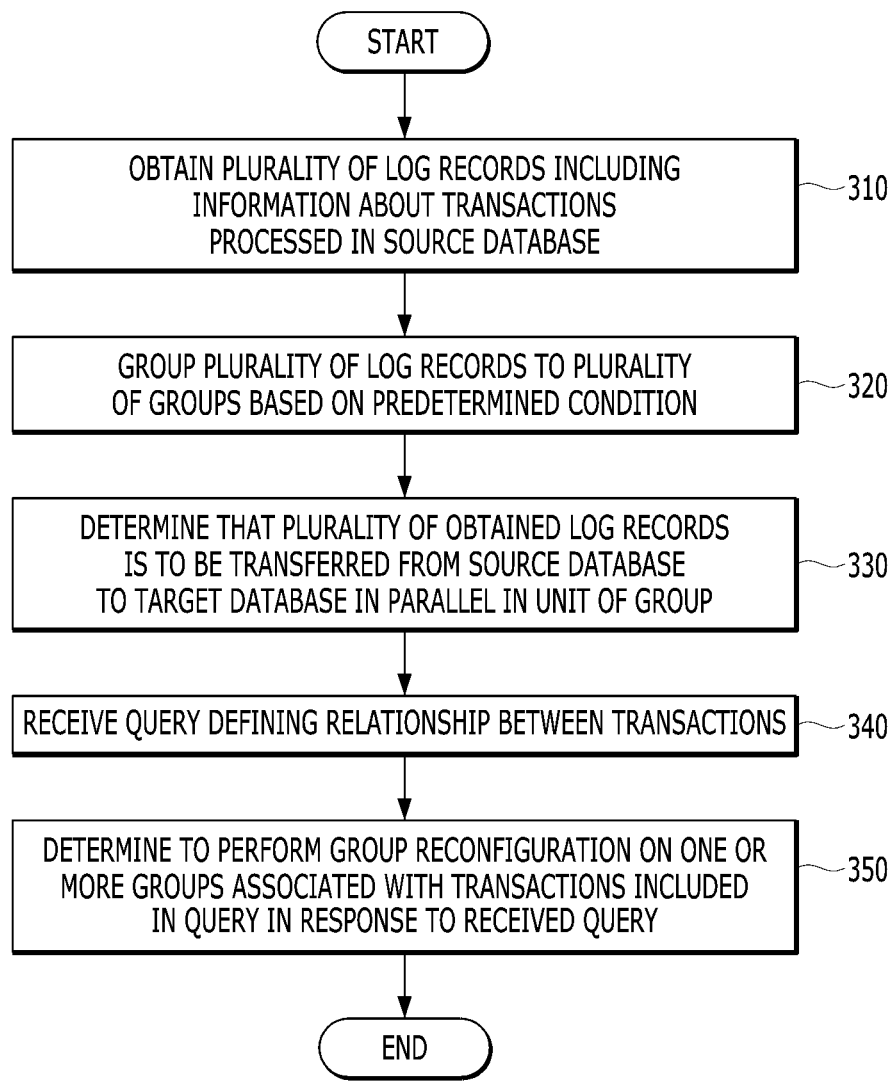
FIG. 3 is a diagram illustrating an example of a method of replicating data from a source database server to a target database server according to the exemplary embodiment of the present disclosure.

FIG. 3 is a diagram illustrating an example of a method of replicating data from the source database server to the target database server according to the exemplary embodiment of the present disclosure.

Sequences of the method illustrated in FIG. 3 are illustrative, and additional operations may be added or some of the illustrated operations may be omitted.

Hereinafter, it is described that the method presented in FIG. 3 is performed by the agent server 130 for convenience of the description, but as described above, the method may also be implemented by the source database server 110, the target database server 120, or a combination thereof according to an implementation aspect.

The agent server 130 may obtain a plurality of log records including information about transactions processed in the source database (310).

When data, a table, an index, and the like are changed in the source database according to a transaction disclosed by a client, a log record for the corresponding transaction may be recorded in the source database. In this case, the agent server 130 may analyze a transaction log and the like recorded in a log buffer and/or a log file in the source database server 110 to obtain a log record(s) for the changed data.

As an alternative exemplary embodiment, the agent server 130 may also simply receive a log record for the changed data determined by the source database server 110 from the source database server 110.

As another alternative exemplary embodiment, for example, when a DML is generated in a source table of the source database server 110, the agent server 130 may obtain data newly changed after the most recently obtained/extracted changed data. A log record for the changed data may be stored and recorded in a separate table.

The agent server 130 may group the plurality of obtained log records to a plurality of groups based on a predetermined condition (320).

For example, the agent server 130 may generate the groups in the unit of object identification information included in meta data of the log records. The transactions (log records) belonging to each group may be arranged in the group based on an SCN. For example, the log record for the transaction which has the earliest SCN may be reflected to the target database server earlier than the log record for a subsequent transaction.

In one aspect of the present invention, the agent server 130 may perform the grouping based on whether there exists dependency (a reference relationship between a primary key and a foreign key) between the objects. The agent server 130 may group the objects having dependency into one group.

The agent server 130 may determine to transfer or replicate the plurality of obtained log records from the source database to the target database in the unit of the group in parallel (330).

The existing log records (for example, a redo log) are sequentially arranged in one queue (based on the SCN and the like), so that when the CDC is performed according to an existing arrangement structure of the log records of the database, the data replication/synchronization is inevitably delayed. However, as described above, according to the exemplary embodiment of the present invention, each of the groups includes the log record according to the transaction for a different object, so that a problem in consistency of the transactions performed in the source database server is not generated, and the corresponding records may be rapidly replicated to the corresponding objects in the target database server in parallel.

The agent server 130 may receive a query defining a relationship between the transactions (340). After the obtained log records are allocated to the groups, respectively, and during the reflection of the obtained log records to the corresponding object of the target database server by a thread related to each group according to a commit command, a query (for example, a DDL) defining a relationship between the transactions or a relationship between the objects may be issued. In this case, a dependent relationship between specific transactions or a dependent relationship between objects (or a change in the dependent relationship) may be formed. In this case, in order to maintain consistency for the data replication, the log records related to the transactions associated with the corresponding query need to belong to one group.

Accordingly, the agent server 130 may determine to perform the group reconfiguration on one or more groups associated with the transactions and/or the objects included in the query in response to the received query (350).

In this case, the agent server 130 may determine whether the relationship defined by the corresponding query is included in a predetermined relationship (for example, the case where the dependency between the objects is changed or the case where dependency between the objects is newly generated). When it is determined that the relationship defined by the corresponding query is included in the predetermined relationship, whether the transactions belonging to the predetermined relationship are included in one group may be additionally determined. For example, the transactions belonging to a parent/child relationship and/or a reference relationship between the primary key and the foreign key of the objects have the dependent relationship in a processing order of the transaction (that is, a deletion order and the like are dependent), so that when the transactions are included in one group, a problem in consistency may not be generated in performing the replication reflected based on a time sequence (for example, the SCN) within the group in the unit of the group. However, the transactions belonging to the relationships are not included in one group, the agent server 130 determines to perform the group reconfiguration so that the transactions belonging to the relationships are included in one group, thereby securing consistency in synchronizing the databases. Herein, the group reconfiguration may include a movement of a transaction(s) included in a specific group to another group.

In the exemplary embodiment of the present invention, when the query defining the relationship between the transactions is received, the agent server 130 may determine to stop the replication of the plurality of obtained log records from the source database to the target database until the group reconfiguration is completed. In this case, when the query defining the relationship between the transactions is received, the agent server 130 may determine to stop the replication of the log records associated with the transactions committed after information on the point in time of the occurrence of the query among the plurality of obtained log records from the source database to the target database while permitting the replication of the log records associated with the transactions committed before information on the point in time of the occurrence of the query among the plurality of obtained log records based on the SCN from the source database to the target database until the group reconfiguration is completed. The reason is that, for example, there is no problem in consistency even though the replication is performed on the transactions committed before the issuance of the DDL.

Then, when the group reconfiguration is completed, the agent server 130 may determine to resume the replication of the plurality of obtained log records from the source database to the target database based on the reconfigured groups. In this case, the replication of the log records to the target database may be performed in the unit of the reconfigured group. The replication in the present specification may use various methods, such as a method of reflecting a transaction related to a corresponding log record to a corresponding object of the target database and a method of reflecting the transaction through a separate view, but the present invention is not limited thereto.

In the exemplary embodiment of the present invention, the replication of the log records to the target database may be performed based on meta information (for example, SCN information, table information, and data identification information) related to the transaction included in the log record. The target database server 120 or the agent server 130 may analyze the obtained log records, and assemble the corresponding log records in the form (for example, a data form recognizable by the processors of the target database) that may be reflected to the target database server 120. For example, when a first transaction performed in the source database is related to a first table, the first transaction may be reflected to the first table of the target database.

In an additional exemplary embodiment of the present invention, the group reconfiguration of operation 350 may be additionally performed by monitoring a hit rate for one or more groups. That is, the agent server 130 may determine to perform the group reconfiguration on one or more groups associated with the transactions included in the query additionally based on the monitored hit rate, as well as the DDL information in the received query. The agent server 130 may perform the group reconfiguration, such as a group division and a movement of the transaction to another group, on the groups having a higher hit rate (that is, having the larger number of times of the occurrence of the log record) in order to improve efficiency of the parallel processing.

Figure 4:
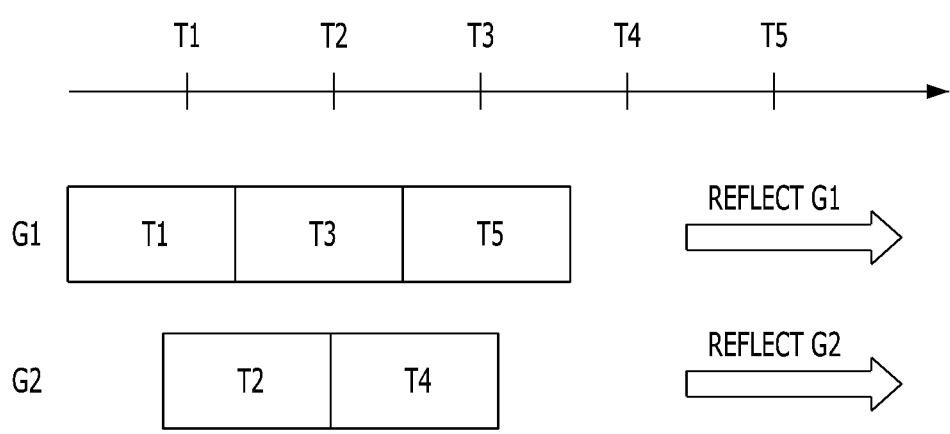
FIG. 4 is a diagram illustrating an example of a multi-group application in a CDC process according to the exemplary embodiment of the present disclosure.

FIG. 4 is a diagram illustrating an example of a multi-group application in a CDC process according to the exemplary embodiment of the present disclosure.

A first transaction T1, a second transaction T2, a third transaction T3, a fourth transaction T4, and a fifth transaction T5 are performed in the source database server, and corresponding log records are recorded in a log file/log buffer and the like according to an order of occurrence as illustrated in FIG. 4.

The first transaction T1, the third transaction T3, and the fifth transaction T5 are the transactions for a first object. Accordingly, the transactions may be grouped into a first group G1. Further, the second transaction T2 and the fourth transaction T4 are the transactions for a second object. Accordingly, the transactions may be grouped into a second group G2.

The first group G1 and the second group G2 may be independently reflected to the target database server 120 in parallel.

Accordingly, when the CDC is implemented according to an existing one-dimensional time series arrangement of the database log records, there is a problem in that a processing speed is low. However, when a multi-group application method according to the exemplary embodiment of the present invention is used, it is possible to achieve a high speed in implementing the CDC as described above.

Figure 5:
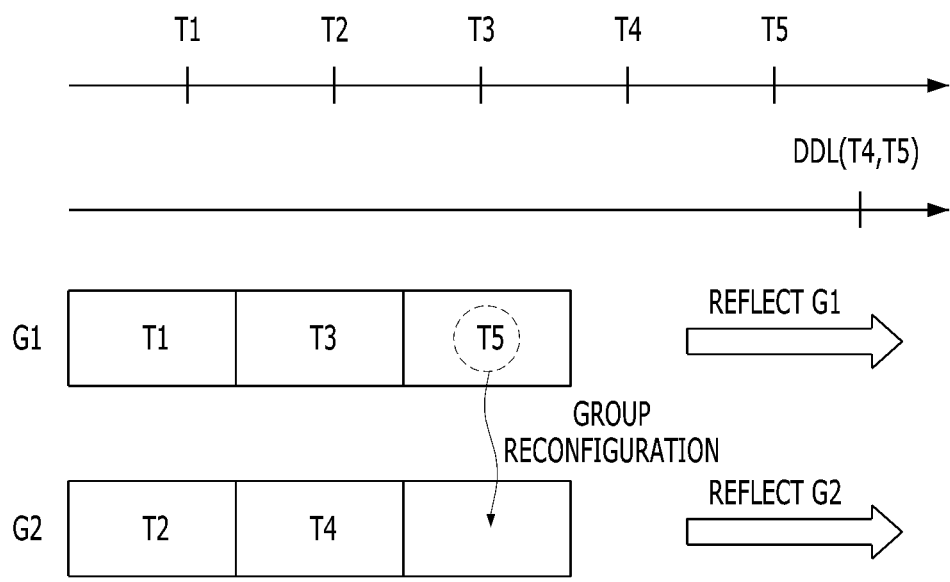
FIG. 5 is a diagram illustrating an example of group reconfiguration in the CDC process according to the exemplary embodiment of the present disclosure.

FIG. 5 is a diagram illustrating an example of the group reconfiguration in the CDC process according to the exemplary embodiment of the present disclosure.

In FIG. 5, it is assumed that the DDL indicating that there is a predetermined relationship between the transactions T4 and T5 after the grouping in a multi-group application situation illustrated in FIG. 4 is received. Further, after the corresponding DDL is received, the transactions T4 and T5 are to be committed.

As illustrated in FIG. 5, since the transactions T4 and T5 having dependency regulated in the DDL currently belong to different groups, a problem in consistency between the databases may be generated when the multi-group application method is used. Accordingly, in this case, as illustrated in FIG. 5, the transaction T5 may be moved from the group G1 to the group G2. According to the movement of the transaction T5 between the groups, the transactions T4 and T5 finally belong to the same group. Accordingly, the transactions T4 and T5 having the dependent relationship belong to the same group, so that even though the multi-group application method is used, a problem in consistency of the databases in the CDC may be solved.

The exemplary embodiment illustrated in FIGS. 4 and 5 is simply illustrative, and other implementation examples may also belong to the scope of the present invention. For example, the transaction T5 is not moved from the group G1 to the group G2, but the transaction T4 may be moved from the group G2 to the group G1. As another example, the transactions T4 and T5 may be moved from the group G2 and the group G1, respectively, to form a new group G3.

As described above, according to the exemplary embodiment of the present disclosure, it is possible to group the log records based on the relationship between the objects and reflect the grouped log records in parallel for increasing a speed of synchronization between the databases, and when the corresponding group is dynamically changed, consistency is lost, so that it is possible to perform a group redistribution without an interruption.

Figure 6:
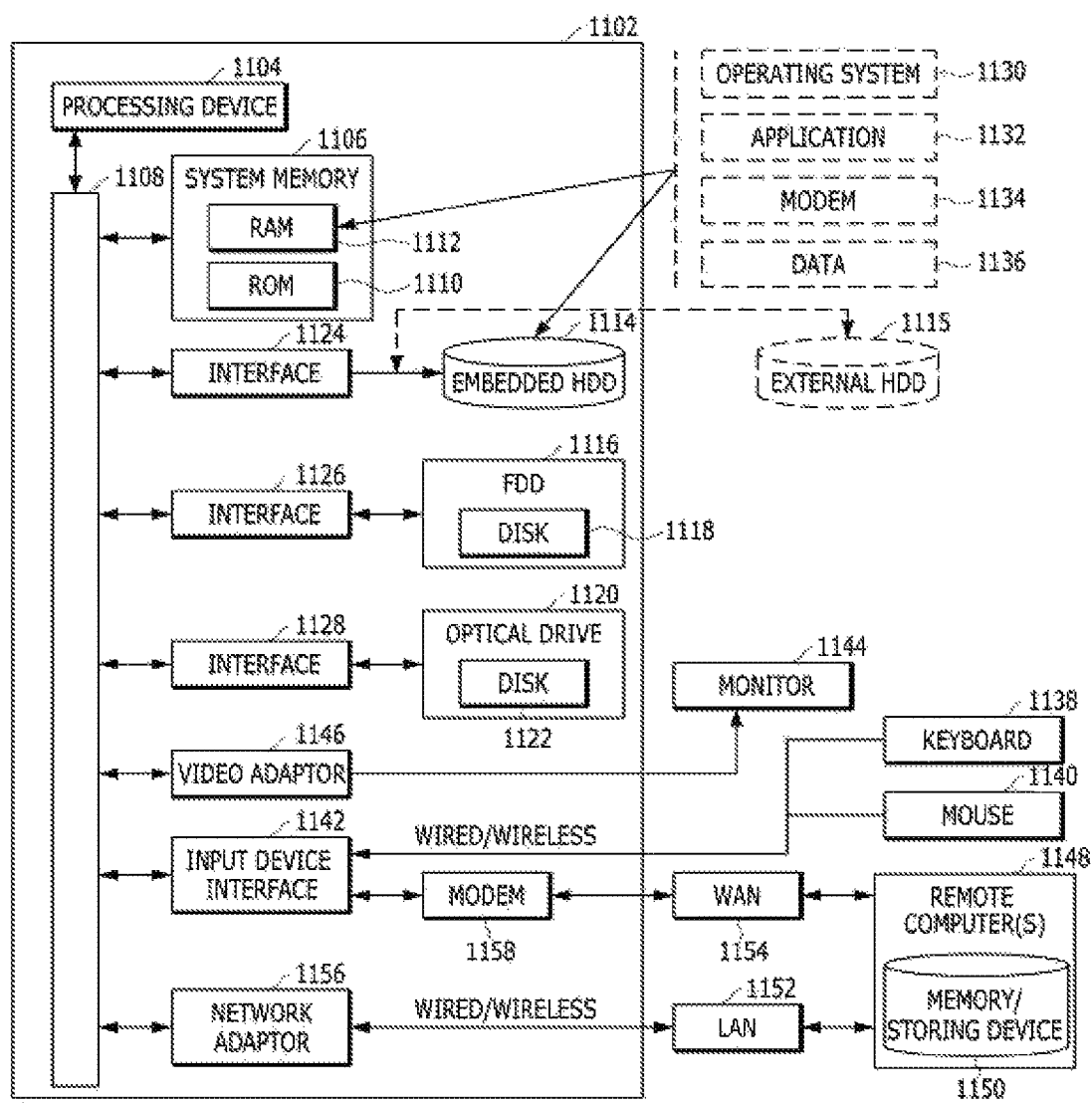
FIG. 6 is a block diagram illustrating an example of a computing device for implementing a CDC solution according to the exemplary embodiment of the present disclosure.

FIG. 6 is a block diagram illustrating an example of a computing device for implementing a CDC solution according to the exemplary embodiment of the present disclosure.

The present invention has been generally described in relation to the characteristics executable in a computer or a processor within one or more servers, but those skilled in the art will appreciate that the present invention may be implemented with a combination of other program modules and/or a combination of hardware and software.

In general, a program module includes a routine, a program, a component, a data structure, and the like performing a specific task or implementing a specific abstract data type. Further, those skilled in the art will appreciate that the method of the present invention may be carried out by a single-processor or multiprocessor computer system, a mini-computer, and a main frame computer, and other computer system configurations, such as a personal computer, a hand-held computing device, microprocessor-based or programmable home appliances, and the like (each of which may be connected with one or more associated devices and be operated).

The exemplary embodiments of the present invention may be carried out in a distribution computing environment, in which specific tasks are performed by remote processing devices connected through a communication network. In the distribution computing environment, a program module may be positioned in both a local memory storage device and a remote memory storage device.

The computer generally includes various computer readable media. A computer accessible medium may be a computer readable medium regardless of the kind of medium, and the computer readable medium includes volatile and non-volatile media, transitory and non-non-transitory media, portable and non-portable media. As a not-limited example, the computer readable medium may include a computer storage medium. The computer storage medium includes volatile and non-volatile media, transitory and non-non-transitory media, portable and non-portable media constructed by a predetermined method or technology, which stores information, such as a computer readable command, a data structure, a program module, or other data. The computer storage medium includes a read only memory (RAM), a read only memory (ROM), electrically erasable and programmable ROM (EEPROM), a flash memory, or other memory technologies, a compact disc (CD)-ROM, a digital video disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The transceiving (communication) medium generally includes all of the information transport media, such as a carrier wave or other transport mechanisms, which implement a computer readable command, a data structure, a program module, or other data in a modulated data signal. The modulated data signal means a signal, of which one or more of the characteristics are set or changed so as to encode information within the signal. As a non-limited example, the transceiving (communication) medium includes a wired medium, such as a wired network or a direct-wired connection, and a wireless medium, such as sound, radio frequency (RF), infrared rays, and other wireless media.

FIG. 6 illustrates an illustrative environment 600 which includes a computing device 602 for implementing the CDC characteristics of the present invention and implements various aspects of the present invention, and the computing device 602 includes a processing device 604, a system memory 606, and a system bus 608. The system bus 608 connects system components including the system memory 606 (not limited) to the processing device 604. The processing device 604 may be a predetermined processor among various common processors. A dual processor and other multi-processor architectures may also be used as the processing device 604.

The system bus 608 may be a predetermined one among several types of bus structure, which may be additionally connectable to a local bus using a predetermined one among a memory bus, a peripheral device bus, and various common bus architectures. The system memory 606 includes a ROM 610, and a RAM 612. A basic input/output system (BIOS) is stored in a non-volatile memory 610, such as a ROM, an erasable and programmable ROM (EPROM), and an EEPROM, and the BIOS includes a basic routine helping a transport of information among the constituent elements within the computing device 602 at a time, such as starting. The RAM 612 may also include a high-rate RAM, such as a static RAM, for caching data.

The computing device 602 also includes an embedded hard disk drive (HDD) 614 (for example, enhanced integrated drive electronics (EIDE) and serial advanced technology attachment (SATA))—the embedded HDD 614 being configured for outer mounted usage within a proper chassis (not illustrated)—a magnetic floppy disk drive (FDD) 616 (for example, which is for reading data from a portable diskette 618 or recording data in the portable diskette 618), and an optical disk drive 620 (for example, which is for reading a CD-ROM disk 622, or reading data from other high-capacity optical media, such as a DVD, or recording data in the high-capacity optical media). The hard disk drive 614, the magnetic disk drive 616, and the optical disk drive 620 may be connected to a system bus 608 by a hard disk drive interface 624, a magnetic disk drive interface 626, and an optical drive interface 628, respectively. The interface 624 for implementing an outer mounted drive includes at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computing device 602, the drive and the medium correspond to the storage of predetermined data in an appropriate digital form. In the description of the computer readable media, the HDD, the portable magnetic disk, and the portable optical media, such as a CD, or a DVD, are mentioned, but those skilled in the art will appreciate well that other types of compute readable media, such as a zip drive, a magnetic cassette, a flash memory card, and a cartridge, may also be used in the illustrative operation environment, and the predetermined medium may include computer executable commands for performing the methods of the present invention.

A plurality of program modules including an operation system 630, one or more application programs 632, other program modules 634, and program data 636 may be stored in the drive and the RAM 612. An entirety or a part of the operation system, the application, the module, and/or data may also be cached in the RAM 612. Those skilled in the art will appreciate well that the present invention may be implemented by several commercially available operating systems or a combination of the operating systems.

A user may input a command and information to the computing device 602 through one or more wired/wireless input devices, for example, a keyboard 638 and a pointing device, such as a mouse 640. Other input devices (not illustrated) may be a microphone, an IR remote controller, a joystick, a game pad, a stylus pen, a touch screen, and the like. The foregoing and other input devices are frequently connected to the processing device 604 through an input device interface 642 connected to the system bus 608, but may be connected by other interfaces, such as a parallel port, an IEEE 1394 serial port, a game port, a USB port, an IR interface, and other interfaces.

A monitor 644 or other types of display device are also connected to the system bus 608 through an interface, such as a video adapter 646. In addition to the monitor 644, the computer generally includes other peripheral output devices (not illustrated), such as a speaker and a printer.

The computing device 602 may be operated in a networked environment by using a logical connection to one or more remote computers, such as remote computer(s) 648, through wired and/or wireless communication. The remote computer(s) 648 may be a workstation, a server computer, a router, a personal computer, a portable computer, a microprocessor-based entertainment device, a peer device, and other general network nodes, and generally includes a plurality of or an entirety of the constituent elements described for the computing device 602, but only a memory storage device 650 is illustrated for simplicity. The illustrated logical connection includes a wired/wireless connection to a local area network (LAN) 652 and/or a larger network, for example, a wide area network (WAN) 654. The LAN and WAN networking environments are general in an office and a company, and make an enterprise-wide computer network, such as an Intranet, easy, and all of the LAN and WAN networking environments may be connected to a worldwide computer network, for example, Internet.

When the computing device 602 is used in the LAN networking environment, the computing device 602 is connected to the local network 652 through a wired and/or wireless communication network interface or an adapter 656. The adapter 656 may make wired or wireless communication to the LAN 652 easy, and the LAN 652 also includes a wireless access point installed therein for the communication with the wireless adapter 656. When the computing device 602 is used in the WAN networking environment, the computing device 602 may include a modem 658, is connected to a communication server on a WAN 654, or includes other means setting communication through the WAN 654 via the Internet. The modem 658, which may be an embedded or outer-mounted and wired or wireless device, is connected to the system bus 608 through a serial port interface 642. In the networked environment, the program modules described for the computing device 602 or some of the program modules may be stored in a remote memory/storage device 650. The illustrated network connection is illustrative, and those skilled in the art will appreciate well that other means setting a communication link between the computers may be used.

The computing device 602 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.6 (a, b, g, etc.) for providing a safe, reliable, and high-rate wireless connection. The Wi-Fi may be used for connecting to the computer, the Internet, and the wired network (IEEE 802.3 or Ethernet is used). The Wi-Fi network may be operated at, for example, a data rate of 6 Mbps (802.6a) or 54 Mbps (802.6b) in an unauthorized 2.4 and 5 GHz wireless band, or may be operated in a product including both bands (dual bands).

Those skilled in the art will appreciate that the various illustrative logical blocks, modules, processors, means, circuits, and algorithm operations described in relation to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present invention.

Various exemplary embodiments presented herein may be implemented by a method, a device, or a manufactured article using a standard programming and/or engineering technology. A term "manufactured article" includes a computer program, a carrier, or a medium accessible from a predetermined computer-readable device. For example, the computer-readable medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information. The term "machine-readable medium" includes various other media which are capable of storing and possessing a command(s) and/or data, but is not limited thereto.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present invention. Various modifications of the exemplary embodiments may be apparent to those skilled in the art, and general principles defined herein may be applied to other exemplary embodiments without departing from the scope of the present invention. Accordingly, the present disclosure is not limited to the exemplary embodiments suggested herein, and shall be interpreted within the broadest meaning range consistent to the principles and new characteristics presented herein.

What is claimed is:

1. A non-transitory computer readable medium comprising a computer program, the computer program causing a computer to perform steps for a Change Data Capture method between a source database and a target database when executed by one or more processors, comprising:
    obtaining a plurality of log records comprising information about transactions processed in the source database;
    grouping the obtained plurality of log records into a plurality of groups based on a predetermined condition, wherein the log records belonging to each of the plurality of groups are arranged in a group based on the order of their occurrence;
    determining that the obtained plurality of log records are to be replicated from the source database to the target database in parallel on a group basis, based on meta information related to the transactions that is included in the information about the transactions; and
    performing at least one group reconfiguration for moving one or more transactions belonging to a first group into a second group based on a first query, wherein the first query defines a relationship between at least one of (a) transactions of the obtained plurality of log records belonging in the plurality of groups, (b) hit rates for the plurality of groups, and (c) a determined consistency for the plurality of groups.

2. The non-transitory computer readable medium according to claim 1, wherein performing the at least one group reconfiguration for moving the one or more transactions belonging to the first group into the second group based on the first query further comprises:
    receiving a second query defining a relationship between transactions; and in response to the second query, determining whether to perform group reconfiguration for one or more groups associated with transactions included in the second query.

3. The non-transitory computer readable medium according to claim 2, wherein the query comprises a Data Definition Language (DDL) that defines the relationships between the transactions or objects, and wherein determining to perform the group reconfiguration, further comprises the steps of:
    determining whether a relationship defined in the DDL is included in a predetermined relationship;
    determining whether transactions belonging to the predetermined relationship are included in one group, when it is determined to be included in the predetermined relationship; and
    determining to perform group reconfiguration such that transactions belonging to the predetermined relationship are included in one group, when it is determined not to be included in the one group.

4. The non-transitory computer readable medium according to claim 1, further comprising:
    determining to stop replication of the obtained plurality of log records from the source database to the target database until the group reconfiguration is completed, when receiving a query defining the relationships between the transactions or objects; and
    determining to resume replication of the obtained plurality of log records from the source database to the target database based on reconfigured groups when the group reconfiguration is completed.

5. The non-transitory computer readable medium according to claim 4, wherein the determining to stop replication to the target database further comprises:
    determining to stop replication of the obtained plurality of log records associated with a transaction committed after the point in time of the occurrence of the query, from the source database to the target database, while allowing replication of the obtained plurality of log records associated with a transaction committed before the point in time of the occurrence of the query, from the source database to the target database, until the group reconfiguration is completed, when receiving the query defining the relationships between the transactions or objects.

6. The non-transitory computer readable medium according to claim 1, further comprising:
    monitoring a hit rate for the one or more groups; and
    wherein the determining to perform group reconfiguration further comprises:
    determining to perform group reconfiguration for one or more groups associated with transactions included in the query, based on the monitored hit rate and the received query.

7. The non-transitory computer readable medium according to claim 6, wherein the hit rate comprises information on the number of occurrences of log records in the group.

8. The non-transitory computer readable medium according to claim 7, wherein the group reconfiguration further comprises:
    moving log records belonging to a group having a larger number of occurrences of log records to a group having a smaller number of occurrences of log records.

9. The non-transitory computer readable medium according to claim 1, wherein the predetermined condition comprises database object identification information associated with each of the transactions.

10. The non-transitory computer readable medium according to claim 1,
    wherein the predetermined condition comprises conditions for dependency between objects,
    wherein the dependency is determined based on a reference between a primary key and a foreign key, and
    wherein the grouping comprises grouping objects in which the dependency exists into one group.

11. The non-transitory computer readable medium according to claim 1, further comprising:

receiving a query from a client;

determining whether a consistency of the grouped groups is maintained by analyzing the received query; and determining to perform group reconfiguration for one or more groups associated with transactions included in the received query, when it is determined that the consistency is not maintained.

12. The non-transitory computer readable medium according to claim 11, wherein the determining whether the consistency is maintained further comprises:

determining that the consistency of the grouped group is not maintained, when the dependency between objects is changed by the received query.

13. The non-transitory computer readable medium according to claim 1, further comprising:

in response to receiving a commit command, independently performing replication from the source database to the target database for one or more log records associated with the commit command on a group basis.

14. The non-transitory computer readable medium according to claim 1, wherein each of the plurality of log records further comprises:

information for uniquely identifying a transaction and information for identifying a data record changed in accordance with the transaction.

15. A server for performing a Change Data Capture method between a source database and a target database, the server further comprising:

one or more computer processors;

one or more computer readable storage devices;

one or more program instructions associated with one or more modules stored on the one or more computer readable storage device for execution by at least one of the one or more computer processors, wherein the one or more modules include:

a log record obtainment and analysis module, wherein the log record obtainment and analysis module is configured to obtain a plurality of log records comprising information about transactions processed in the source database;

a grouping module, wherein the grouping module is configured to group the obtained plurality of log records into a plurality of groups based on a predetermined condition, wherein the log records belonging to each of the plurality of groups are arranged in a group based on the order of their occurrence; and a control module, wherein the control module is configured to determine that the obtained plurality of log records are to be replicated from the source database to the target database in parallel on a group basis based on meta information related to the transactions that is included in the information about the transactions, and perform at least one group reconfiguration for moving one or more transactions belonging to a first group into a second group based on a first query, wherein the first query defines a relationship between at least one of (a) transactions of the obtained plurality of log records belonging in the plurality of groups, (b) hit rates for the plurality of groups, and (c) a determined consistency for the plurality of groups.

16. A Change Data Capture method between a source database and a target database, the Change Data Capture method comprising:

obtaining, by one or more computer processors, a plurality of log records comprising information about transactions processed in the source database;

grouping, by one or more computer processors, the obtained plurality of log records into a plurality of groups based on a predetermined condition, wherein the log records belonging to each of the plurality of groups are arranged in a group based on the order of their occurrence;

determining, by one or more computer processors, that the obtained plurality of log records are to be replicated from the source database to the target database in parallel on a group basis based on meta information related to the transactions that is included in the information about the transactions, wherein the method is performed by one or more computing devices; and performing, by one or more computer processors, at least one group reconfiguration for moving one or more transactions belonging to a first group into a second group based on a first query, wherein the first query defines a relationship between at least one (a) of transactions of the obtained plurality of log records belonging in the plurality of groups, (b) hit rates for the plurality of groups, and (c) a determined consistency for the plurality of groups.

* * * * *